(12) United States Patent
Peddada et al.

(10) Patent No.: US 7,793,302 B2
(45) Date of Patent: *Sep. 7, 2010

(54) SYSTEM AND METHOD FOR DYNAMIC REMOTE OBJECT ACTIVATION

(75) Inventors: Prasad Peddada, Alameda, CA (US); Adam Messinger, San Francisco, CA (US); Anno R. Langen, Berkeley, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 706 days.

This patent is subject to a terminal disclaimer.

(21) Appl. No.: 10/372,464

(22) Filed: Feb. 21, 2003

(65) Prior Publication Data

US 2003/0221023 A1 Nov. 27, 2003

Related U.S. Application Data

(60) Provisional application No. 60/358,767, filed on Feb. 21, 2002.

(51) Int. Cl.
*G06F 9/44* (2006.01)
*G06F 9/54* (2006.01)

(52) U.S. Cl. ........................................ 719/315; 719/330

(58) Field of Classification Search ................. 719/315, 719/316, 330; 707/206
See application file for complete search history.

(56) References Cited

U.S. PATENT DOCUMENTS

| | | | |
|---|---|---|---|
| 5,475,817 A | 12/1995 | Waldo et al. ................ 395/650 |
| 5,870,753 A | 2/1999 | Chang et al. ................ 707/103 |
| 6,134,545 A * | 10/2000 | Sadiq et al. ..................... 707/3 |
| 6,269,373 B1 | 7/2001 | Apte et al. .................... 707/10 |
| 6,339,832 B1 | 1/2002 | Bowman-Amuah ............ 718/1 |
| 6,519,652 B1 | 2/2003 | Sadiq ......................... 709/316 |
| 6,564,240 B2 * | 5/2003 | Waldo et al. ................ 719/316 |
| 6,571,252 B1 | 5/2003 | Mukherjee .................. 707/103 |
| 6,701,323 B2 * | 3/2004 | Sashino et al. .......... 707/103 R |
| 6,782,538 B1 * | 8/2004 | Copeland et al. ............ 719/315 |
| 6,957,427 B1 * | 10/2005 | Wollrath et al. ................ 718/1 |

OTHER PUBLICATIONS

Wollrath et al., "A Distributed Object Model for the Java System," Jun. 1996, USENIX 1996, 14 pages.*
Wollrath et al., "Simple Activation for Distributed Objects," Jun. 1995, USENIX 1995, 12 pages.*

(Continued)

*Primary Examiner*—Li B Zhen
(74) *Attorney, Agent, or Firm*—Fliesler Meyer LLP

(57) ABSTRACT

A system and a method for dynamic or as-needed activation of Remote Method Invocation (RMI) layer remote objects in response to a client request. Object activation allows the system to clean up or delete currently unused remote objects, and then reactivate them when a client actually needs them. An object implementation can first be created in response to a client request. The client receives a remote reference (remote ref) and an activation identifier (activation id) identifying that particular implementation. The implementation can subsequently be cleaned up or deleted during garbage collection so as to save server resources, or alternatively the object can be reused if the system is set up to maintain a pool of objects. When the client requests the same object at a later point in time, the system activates an object based on the activation ID previously received from the server.

16 Claims, 4 Drawing Sheets

OTHER PUBLICATIONS

Frank Sommers, "Activatable Jini services: Implement RMI activation," Oct. 24, 2000, 11 pages.*

"Jini Technology Glossary," Nov. 1999, Sun MicroSystems, Revision 1.0.1, 16 pages.*

Ann Wollrath, Roger Riggs and Jim Waldo, "A Distributed Object Modle for the Java System," Jun. 1996, pp. 1-14.*

Jav™ Remote Method Invocation, Sun Microsystems, Copyright 1997-1998.

Wikipedia, "Garbage Collection," Jun. 10, 2009, ://en.wikipedia.org/wiki/Garbage_collection_(computer science)>, pp. 1-17.

Sun Microsystems, Inc., Java Remote Method invocation, Table of Contents, copyright 1997-2001.

Sun Microsystems, Inc., Remote Method invocation Specification, copyright 1996-1997.

* cited by examiner (Object Activation Not Used)

(Object Activation Not Used)

SYSTEM AND METHOD FOR DYNAMIC REMOTE OBJECT ACTIVATION

CLAIM OF PRIORITY

This application claims priority from U.S. Provisional Patent Application SYSTEM AND METHOD OBJECT ACTIVATION; Inventors Prasad Peddada, Anno R. Langen, and Adam Messinger, Application No. 60/358,767, filed Feb. 21, 2002, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to a system and a method for dynamic activation of remote objects in response to a client request.

CROSS-REFERENCES

This application is related to co-pending applications United States Provisional Patent Application SYSTEM AND METHOD FOR DYNAMIC ACTIVATION OF ENTERPRISE JAVA BEANS Inventors Michael Chen, Prasad Peddada and Anno R. Langen, Application No. 60/358,751, filed Feb. 21, 2002, and United States Utility Patent Application SYSTEM AND METHOD FOR DYNAMIC ACTIVATION OF ENTERPRISE JAVA BEANS Inventors Michael Chen, Prasad Peddada and Anno R. Langen, application Ser. No. 10/370,930, filed Feb. 20, 2003 which applications are also incorporated herein by reference.

BACKGROUND

An ever-increasing number of e-commerce providers or e-businesses rely on application server technology as the lifeblood of their business. Application servers form a proven foundation for developing and supporting e-commerce applications, providing the presentation, business and information-access logic, security and management services, and the underlying infrastructure required for running highly scalable and mission-critical software applications. Increasingly, the demands of today's modern businesses require support for a new breed of Web and wireless applications, helping to meet the needs of increasingly sophisticated customers.

One such application server, WebLogic Server, from BEA Systems, Inc. San Jose, Calif., is based on an implementation of the Java 2 Enterprise Edition (J2EE) specification. WebLogic Server is used as the backbone for many of today's most sophisticated e-business applications, and plays an integral role in a tightly integrated, comprehensive infrastructure that delivers commerce, personalization, campaign management, enterprise integration, workflow management, and business-to-business collaboration. WebLogic Server manages all of the underlying complexities of a business' e-commerce applications, allows the organization to focus instead on delivering new and innovative products and services.

A typical application server, including WebLogic Server, supports a variety of clients, including Web browsers, standalone clients, and wireless devices. On the server side, WebLogic Server operates on a variety of operating systems. On the back-end, WebLogic Server integrates with relational databases, messages queues, and legacy systems. WebLogic Server also provides support for features such as Servlets, Java Server Pages (JSPs), Enterprise JavaBeans (EJBs), and Java Messaging Service (JMS), to provide access to standard network protocols, database, and messaging systems. Clients can communicate with these server-side features using, for example, Remote Method Invocation (RMI) calls. RMI allows an object running on a first Java virtual machine or JVM to invoke methods on a remote object running on a second JVM. Typically the machine making the invoke is referred to as the client, and the machine responding to the invoke referred to as the server.

A problem with many application servers as they are currently implemented, is that the server must keep track of all of the remote objects as they are created. As the server handles request from clients, additional object implementations may be created. Because in many instances the server does not know when (if ever) these object implementations will be reused by the client, it may not delete them for a long period of time. As a result, the number of objects steadily increases during use, and remain on the server for indefinite periods of time. There is a lot of system overhead associated with these objects—for example, each object has to be runtime setup to take client calls. The increase in objects thus limits the overall scalability of the server, and as such they should be garbage collected when no longer in use. Mechanisms that can increase both server scalability, and flexibility in handling and managing a large number of object instances are highly desirable.

One approach to this problem is through lazy activation of RMI objects, as described in the Java RMI Specification, incorporated herein by reference. Object activation can be used to provide persistent references to objects, and to manage the execution of object implementations. In RMI lazy activation, when an activatable object is accessed through a remote method invocation the system initiates the Object's execution inside an appropriate JVM. As referred to in the context of RMI lazy activation, an active object is a remote object that is instantiated and exported in a JVM. A passive object is one that is not yet instantiated) in a JVM, but which can be brought into an active state. Activation transforms a passive object into an active object, a process that requires the object be associated with a JVM. Lazy activation essentially defers activating an object until a client's first use (usually when the client invokes the object).

In RMI lazy activation, activation of remote objects is implemented using a process known as faulting remote reference—a reference to a remote object that "faults in" the active objects reference upon the first method invocation to the object. In practice, the remote objects stub contains the faulting remote reference. Each faulting reference maintains both a persistent reference (activation identifier, or activation id), and a transient remote reference to the target remote object. The remote object's activation ID contains the necessary information to allow a third party to activate the object. The transient reference is then used to actually contact the executing object. If the live reference to a remote object is null, the target object is not known to be active. When invoked, the faulting reference obtains a "live" reference, or remote reference for the newly-activated object. The faulting reference then forwards method invocations to the underlying remote reference, which in turn forwards the method invocation to the remote object.

During a remote method invocation, if the live reference for a target object is unknown, the faulting reference engages in the activation protocol. An activator supervises the activation, usually by mapping activation identifiers to the information necessary to activate an object, such as the object's class; and by starting up JVMs (when necessary) and forwarding requests for object activation to the correct activation group inside the remote JVM. Activation groups receive the request to activate an object in the JVM, and return the activated object back to the activator. During activation a faulting reference provides an activation ID and calls the activator to activate the object associated with the identifier. The activator looks up the object's activation descriptor to find the JVM in which it is activated, the object's class name, and object-specific initialization data in marshalled form. The activator then forwards the activation request to the specified group. If the activation group does not already exist, the activator initiates an activation group and then forwards the activation request to the newly executed group. The activation group loads the class for the object and instantiates the object. When the object is activated, the activation group passes back a marshalled object reference to the activator. The activation ID and active reference pairing is recorded, and the active reference returned to the faulting reference. The faulting reference then forwards method invocations via the live reference directly to the remote object.

SUMMARY

The invention provides a system and a method for dynamic or as-needed activation of RMI-layer remote objects in response to a client request. Object activation allows the system to clean up, delete, or re-use remote object implementations as needed, and then reactivate them when a client actually needs them. In accordance with one embodiment, an object implementation can first be created in response to a client request. The client receives a remote reference (remote ref) and an activation identifier (activation ID) identifying that particular implementation. The implementation can subsequently be cleaned up or deleted during garbage collection so as to save server resources, or alternatively the object can be reused if the system is set up to maintain a pool of objects. When the client requests the same object at a later point in time, the object activation system activates an object based on the activation ID previously received from the server.

DETAILED DESCRIPTION

An embodiment of the present invention provides a system and a method for dynamic or as-needed activation of Remote Method Invocation (RMI) layer remote objects in response to a client request. As described herein, object activation allows the system to clean up or delete currently unused remote objects, and then reactivate them when a client actually needs them. In accordance with one embodiment, an object implementation can first be created in response to a client request. The client receives a remote reference (remote ref) and an activation identifier (activation id) identifying that particular implementation. The implementation can subsequently be cleaned up or deleted during garbage collection, or recycled, so as to improve performance and save server resources. When the client requests the same object at a later point in time, the object activation system activates an object based on the activation ID previously received from the server.

Object Activation

In a remote object-based system, multiple instances of a particular remote object can be created to serve requests for that object from a single client, from multiple clients, or from other server processes executing on other servers. These multiple object instances are then made available to the client or server for their needs. Typically, this process of creating multiple object instances is useful because many clients may need simultaneous access to the same server application, or to the same set of data. Multiple instances may also provide performance advantages at the server. To operate successfully, each object instance needs some manner of identification that uniquely identifies that instance, and allows a client to access that particular object instance. In the environment of an application server which uses Remote Method Invocation (RMI) to communicate with other servers or clients, the object instance identification, including both the object's server Id encapsulating addressing information and an instance identifier, can be encapsulated in a server reference (server ref) which resides on the server.

Figure 1:
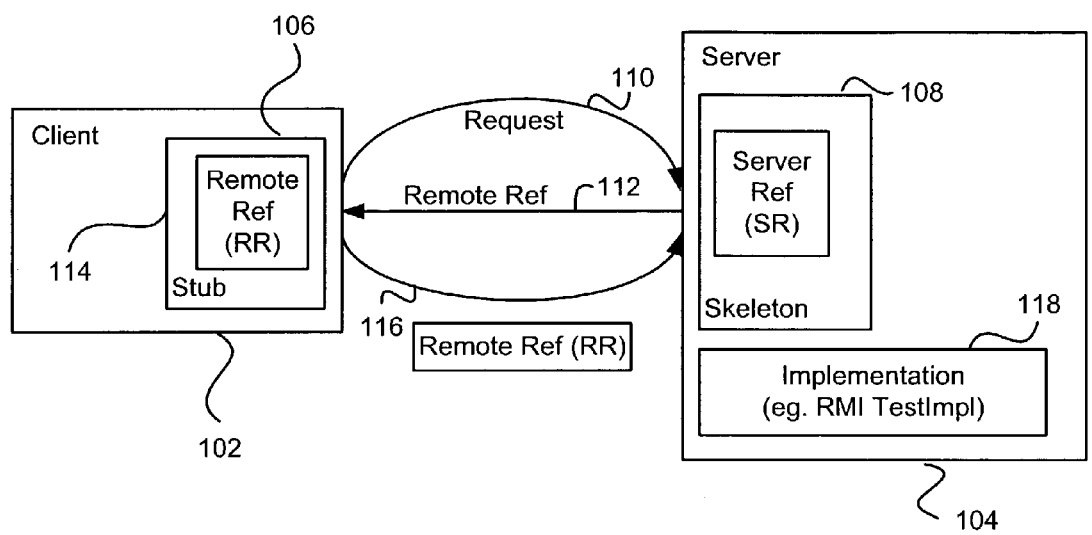
FIG. 1 shows a schematic of a stub-skeleton system that uses remote references to access object implementations at an application server.

FIG. 1 shows a schematic of an application server and client environment in which RMI-layer object activation can be used, in accordance with an embodiment of the invention. In an RMI system such as that shown in FIG. 1, a client 102 accesses an object implementation 118 at a (typically remote) server 104 via a stub 106 at the client, and a skeleton 108 on the server. In order to access the object, the client uses a remote reference (remote ref) to the remote object at the server. The remote ref includes the information necessary to access a particular server (typically a Java virtual machine, JVM, with a corresponding JVM identifier JVMID), and a particular object on that server. The server maintains a server reference (server ref) for the same object instance. A stub implements the remote interface at the client's end, and handles marshalling/unmarshalling between the client and the server ref. The server ref passes any communication from the client to a skeleton which unmarshals parameters. The skeleton interprets commands from the client, such as for example the "get string" (gets) command, and communicates those commands to the server implementation. In the reverse direction, the server ref handles marshalling of the communication, and the remote ref unmarshals return value. In this manner, as long as the client has the appropriate remote ref, it can make calls through the client stub to the appropriate server ref, and to the desired remote object on the server. In practice, when the client first issues an RMI request 110 to the server, the server will respond by implementing an object implementation 118, and creating a server ref for that implementation. The client gets the remote ref 114 back, and uses this remote reference in subsequent object invocation requests to the server 116.

Figure 2:
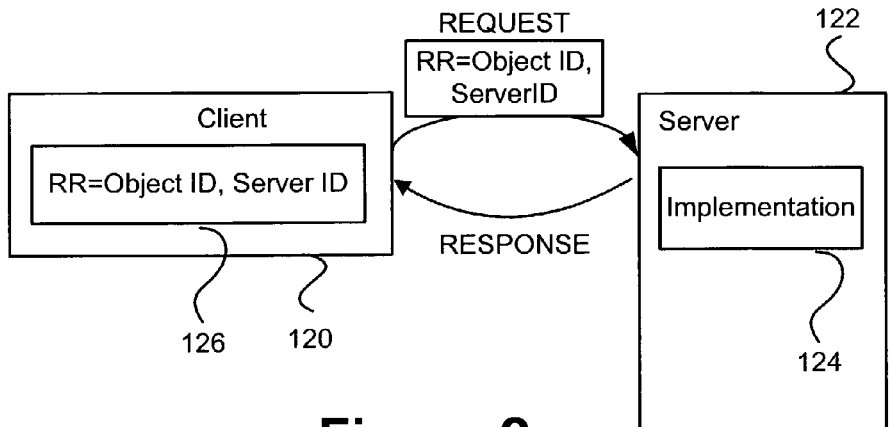
FIG. 2 shows a schematic of an application server that uses traditional object access without RMI-layer object activation.
Figure 3:
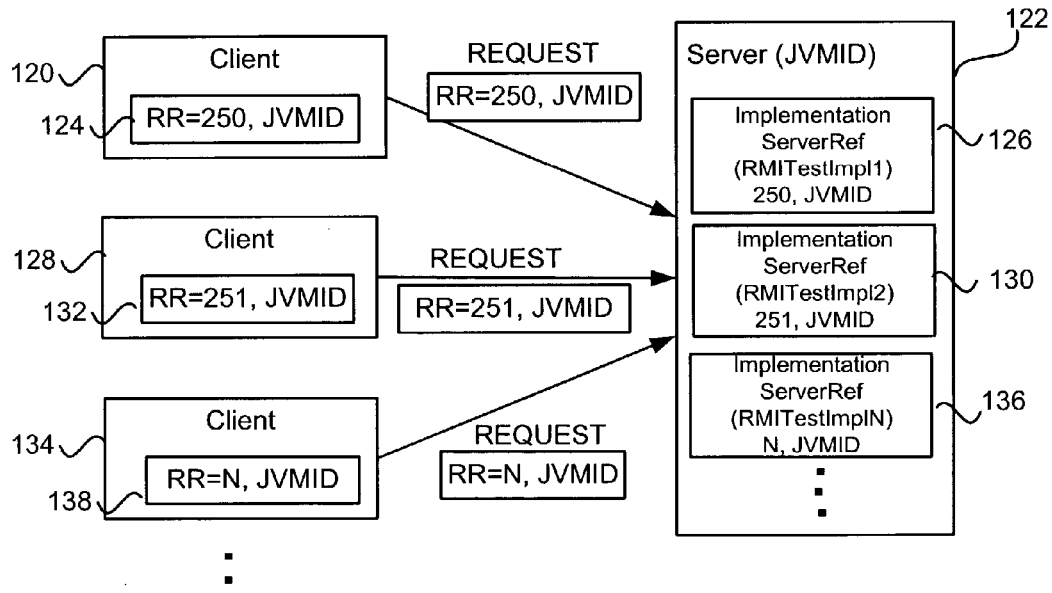
FIG. 3 shows a schematic of an application server that uses traditional multiple object access without object activation.

FIG. 2 and FIG. 3 illustrate the situation in which remote objects are created without using object activation, i.e. in accordance with traditional methods. As shown in FIG. 2, the server holds onto the particular implementation 124, while the client maintains a corresponding remote ref 126. The remote reference includes both an object identifier "Object ID", specifying the particular object implementation, and a server ref identifier "JVMID" specifying the remote Java virtual machine (JVM) at the server where the object can be contacted.

FIG. 3 illustrates an example of the typical manner in which a server responds to multiple client requests, without using object activation. For each instance of remote object, there will one corresponding server reference. For example if there are 10 remote objects, there will be ten server reference objects to handle remote client requests. As multiple clients, or multiple client requests 120, 128, 134 access the same object on the server (or in this instance the same object on a JVM, with address JVMID, executing on the server) the server must maintain multiple object implementations, and corresponding multiple server refs, in this example Server Refs (RMITestImpl(1) corresponding to object instance 250, JVMID) 126, (RMITestImpl(2) corresponding to object instance 251, JVMID) 130, and (RMITestImpl(N) corresponding to object instance N, JVMID) 136, to service the requests. (In the example shown in FIG. 3, the numbers 1, 2, . . . N have no special meaning and are used to denote a series of implementations, while the number 250, 251, N are similarly used to denote a series of object identifiers. The variable JVMID is used to denote the address or identity of a particular server, which in this instance is a JVM process acting as the server. It will be evident that the above values are just examples used for illustration, and that many other examples can be envisaged).

Each client request must include the remote reference to the particular implementation, including the implementation ID and the server ID or JVMID. As long as the client continues to need access to the implementation, the implementation will likely remain on the server indefinitely. In the example shown in FIG. 3 (again without using object activation), each client gets a remote ref, and can make calls on the client stub to the appropriate server, identified by server ref JVMID, and the appropriate object ID, for example "250, JVMID". This can for example be a "get string" (gets) call, or any other call recognized by the remote object. The JVMID value indicates the JVM to be used, while the object ID value of 250 indicates the target object at that server.

However, with traditional systems that don't use object activation, as additional remote objects are created, each new object gets a new object ID, for example 250, 251, 252, . . . N, etc. So, if for example ten RMI objects are created, the system ends up with ten server ref objects. Each of these ten server ref objects must persist (i.e. stay around) as long as the client is around and needs them. A heartbeat mechanism can in some cases be used to terminate implementations the system deems no longer needed, but this approach is not satisfactory since some connections may actually need to be kept open. Using a heartbeat process, the client simply says "I'm still using this RMI TestImpl", and hence no garbage collection is performed on that instance. However this means the server refs must be kept also. In the above example, for every object there would be ten server side implementations/objects, together with the infrastructure needed to support this. Multiplied several times over, with dozens of objects, and hundreds, perhaps even thousands of implementations, the problems can severely impact server performance. In any case, even with using a heartbeat mechanism, it's liable to not work successfully by itself—if the client continues to send heartbeat messages then the object instances persist indefinitely.

Figure 4:
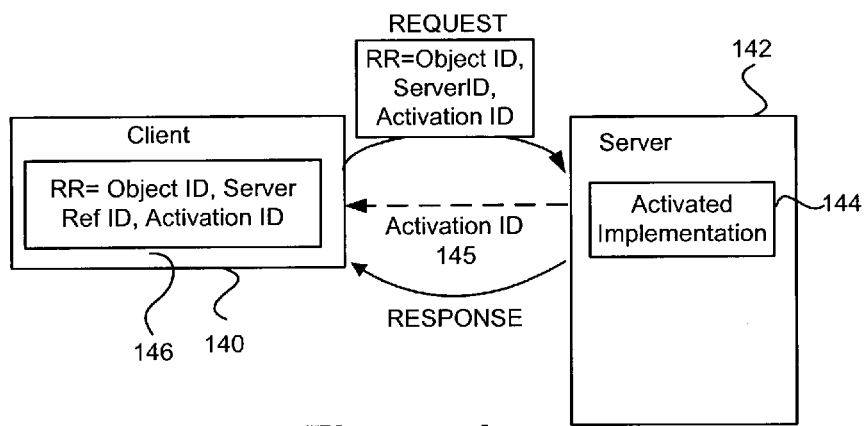
FIG. 4 shows a schematic of an application server that uses RMI-layer object activation in accordance with an embodiment of the invention.
Figure 5:
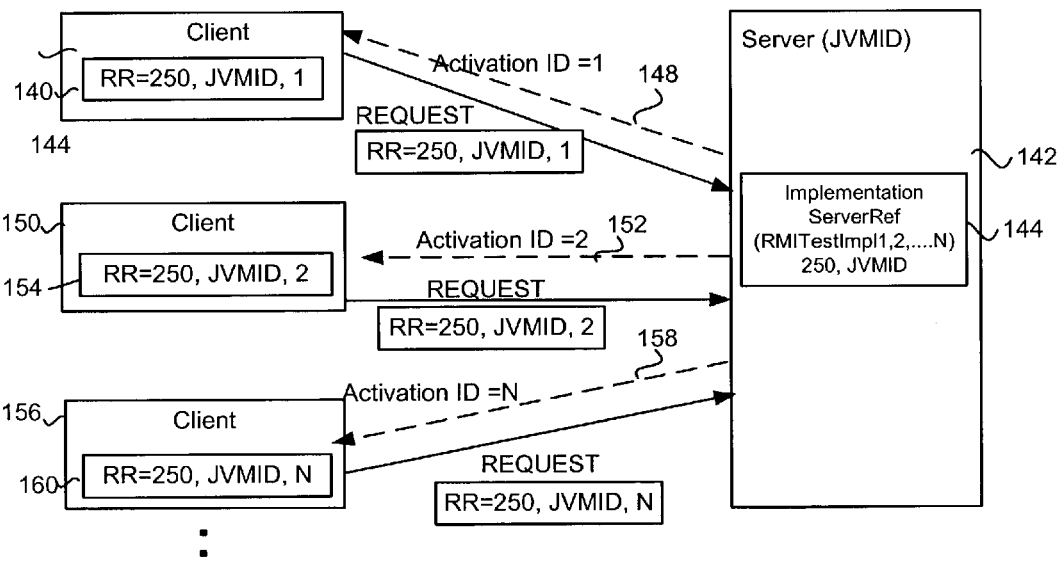
FIG. 5 shows a schematic of an application server that uses RMI-layer object activation for multiple object access with object activation, in accordance with an embodiment of the invention.

FIG. 4 and FIG. 5 illustrate an embodiment of the invention in which object activation is used at the server to minimize the number of server reference objects that must be created to service client requests. The approach makes use of the fact that each object is mostly self-contained, i.e. it contains little if any logic, and can be simply referred to by an identifier. Using this approach the system described above can be replaced or augmented with one in which only a single server ref is maintained for each object instance. As shown in FIG. 4, a request from a client to access a server implementation results in the server creating the implementation. However, in addition to creating the server ref, together with an object ID, and server ID (JVMID), an associated activation ID or activation key 145, is also generated and associated specifically with this particular Object instance when the object is exported to RMI runtime for the first time. When the object identifier is sent to the client, the activation ID is sent also. This activation ID is stored at the client as part of an activatable remote reference. When a call subsequently comes in from that client, the implementation is reactivated using the activation ID, and the appropriate response sent back to the client. As additional clients make calls to the same object, or the same client makes multiple calls, only a single copy of the server ref is retained at the server. The implementation is created as necessary, and can then be removed. The result is less storage of object implementations and corresponding server refs at the server, reduced memory and processing requirements, and overall better performance.

It will be noted that, although referred to as an "activation ID" or "activation key", the activation ID used in the present invention operates differently from the activation ID used in other systems, including that used in the RMI lazy activation process described above. With lazy activation, described above, a faulting ref is used to create an object, activate it, and then create a real server ref for the new object. In the context of that process, the activation ID includes enough information to create the entire object, and is used to create the object instance using the faulting ref. In accordance with the present invention, the activation ID is used to reactivate the desired object, not to create a whole new one entirely from scratch. As such the two methods of activation are quite different.

FIG. 5 illustrates an example of the manner in which a server responds to multiple client requests, with object activation, in accordance with an embodiment of the invention. As shown in FIG. 5, as additional clients try to access an object at the server, or the same client accesses the same object multiple times, instead of creating additional implementations, additional activation id's (activation keys) are generated. Instead of creating multiple instances of server reference objects, there is only one instance of server reference for all the remote objects of the same type and each object instance can be identified with a corresponding activation ID. In the example shown, as a client 140 communicates an RMI request to the server 142 it receives an activation ID 148 in return. This activation ID is used to form the activatable remote reference at the client, that will later be used to access the implementation on the server. The activatable remote reference includes an object ID, a server ID and a specific activation ID for this implementation. The process is similar for clients 150 and 156. When a subsequent call comes in for the same object, e.g. object ID 251, the server can use the activation ID to construct the appropriate RMITestImpl, make the remote call, and send the response back to the client.

A benefit of using activation ID's in this manner is that the server can delete each implementation during a garbage collection process, and can then reactivate the implementation as necessary using the specific activation ID or activation key stored at each activatable remote ref. The result is an increase of performance and scalability at the server, while minimizing the amount of memory requirements for storing each object implementation.

Figure 6:
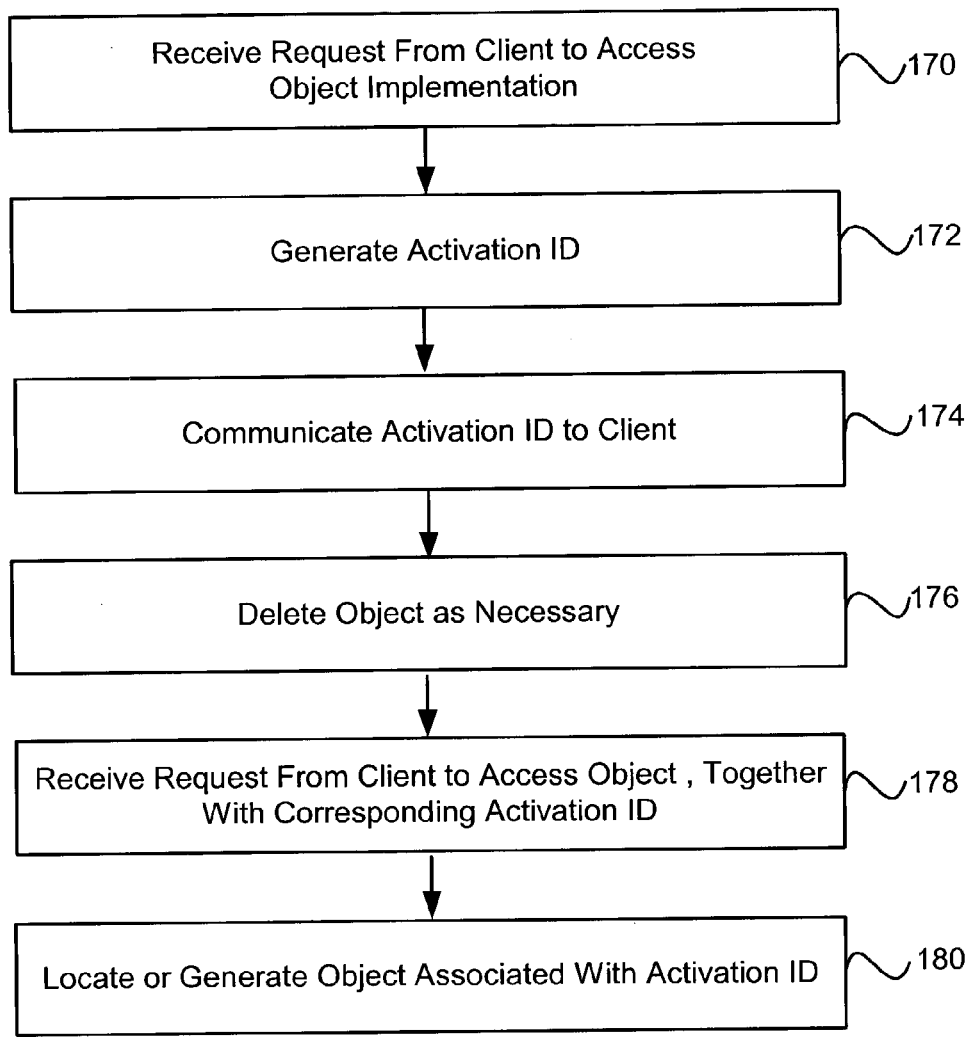
FIG. 6 shows a flowchart of a method used by a server to activate RMI-layer objects in response to a client request, in accordance with an embodiment of the invention.

FIG. 6 illustrates a flow chart of a process used to activate objects in accordance with the invention. As shown in FIG. 6, in step 170 the server receives a request from a client to access an object implementation. In response to this request, in step 172, an activation ID is generated. In step 174, this activation ID is communicated back to the client. The server may then, in step 176, delete any unnecessary objects, preferably during a garbage collection process. Deleting objects in this way helps to minimize the server memory requirements and improve scalability of the system. In step 178, when a subsequent request is received from the client to access an object implementation the server retrieves the corresponding activation ID. In step 180, the server uses this activation ID to locate the desired object implementation for the client.

Interfaces

In one embodiment, when a client makes a call to a server, the call is passed to an activator which is then used to activate or deactivate objects of the required type. In this sense the activator accepts an activation ID, and returns an implementation (for example RMI TestImpl). The activator can also be used to deactivate an object, or put the object back in a pool for subsequent use. Depending on the particular embodiment, deactivated objects can be deleted using a garbage collection process, or can be recycled. Quotas may also be used to determine whether a deactivated object is deleted or recycled.

The process of using an activator can be summarized as follows:

1. The server ref encapsulates the activation information.
2. The client makes a remote call, passing the activation ID,
3. The server calls an activates function, and passes the appropriate object ID,
4. The server obtains a real instance of the object.
5. The server allows the client to invoke on that object instance.
6. When finished, the server calls a deactivate( ) function to remote the object instance.

Use in EJB Environments

In one embodiment, the object activation process can be controlled or accessed using an EJB interface. In this embodiment, each stateful session EJB on the server has an object ID associated with it. Each object instance of that EJB, when created by the client, has an activation ID (i.e. 1, 2, 3, etc.) associated with it. The activation ID is used to activate the EJB when necessary.

When using stateful session beans, when a client wishes to use the EJB, a call is made to a create( ) function on the EJB home. This gives the client a remote object. Multiple clients can create multiple instances of an object, each with their own activation ID, That activation ID is then sent to the client for subsequent use in object activation.

The following code segments illustrate one embodiment of an interface as used in an EJB environment. It will be evident that additional embodiments and variations thereof can be developed, in addition to those shown below.

Activatable.java

All remote activatable objects should implement this interface. This is a marker interface to identify Activatable remote objects to do object replacement easily:

```
public interface Activatable {
    public Object getActivationID( ) ;
    public Activator getActivator( ) ;
}
```

ActivatableRemoteRefJava.java

This constructor is called from the BasicRuntimeDescriptor when the server is exporting an existing remote object:

```
public class ActivatableRemoteRef extends BasicRemoteRef
        implements InitialReferenceConstants, InteropWriteReplaceable
{
    private Object aid = null;
    private static final long serialVersionIUD = 11979770732667131812L;
    public ActivatableRemoteRef( ) { }
    public ActivatableRemoteRef(int oid, HostID hostID, Object aid) {
        super(oid, hostID) ;
        this.aid = aid;
    }
    public Object invoke(Remote stub, RuntimeMethodDescriptor md, Object[] args,
            Method m)
            throws Throwable
    {
        Transaction tx = null;
        TransactionManager tm = TxHelper.getTransactionManager( ) ;
        it (!md.isTransactional( ) ) {
            tx = tm.forceSuspend( ) ;
        }
        OutboundRequest request = getOutboundRequest (md) ;
        request.setActivationID(aid) ;
        InboundResponse response = null;
        try {
            if (md.isOneway( ) ) {
                sendOneway(request, md, args) ;
                return null;
            }
            if (md.hasAsyncResponse( ) || md.hasAsyncParameter( ) ) {
```

```
                return sendAsync(request, md, args) ;
            }
            request .marshalArgs(args) ;
            response = request.sendReceive( ) ;
            return response.unmarshalReturn( ) ;
        }
        finally {
            try {
                if (response != null) response.close( ) ;
            } catch (IOException ioe) {
              throw new UnmarshalException("failed to close response stream", ioe) ;
            }
            if (!md.isTransactional( ) ) tm.forceResume(tx) ;
        }
    }
    public boolean equals( Object obj ) {
        if (this == obj) return true;
        if (! (obj instanceof ActivatableRemoteRef) ) return false;
        ActivatableRemoteRef other = (ActivatableRemoteRef) obj ;
        return ( (getObjectID( ) == other.getObjectID( ) ) &&
            (getHostID( ) .equals(other.getHostID( ) ) ) &&
            (getActivationID( ) .equals(other.getActivationID( ) ) ) ) ;
    }
    public int hashCode( ) { return aid.hashCode( ) ; }
    public Object getActivationID( ) {
        return aid;
    }
    public String toString( ) }
        return super.toString( ) + ", aid: '" + aid + "'";
    }
    public void writeExternal(ObjectOutput out) throws IOException {
        super.writeExternal(out) ;
        out.writeObject(aid) ;
    }
    public void readExternal(ObjectInput in)
        throws IOException, ClassNotFoundException
    {
        super.readExternal(in) ;
        aid = in.readObject( ) ;
    }
}
```

ActivatableServerRef.java
The ActivatableServerRef wraps each instance of a remote object:

```
public class ActivatableServerRef extends BasicServerRef
    implements InitialReferenceConstants
{
    private final Activator activator;
    public ActivatableServerRef (Class c, Activator activator)
        throws RemoteException {
        this (c, OIDManager.getOIDManager( ) .getNextObjectID( ) , activator) ;
    }
    public ActivatableServerRef (Class c, int oid, Activator activator) throws
RemoteException {
        super(c, oid) ;
        this.activator = activator;
        initializeDispatcher ( ) ;
    }
    public RemoteReference getLocalRef (Object aid) {
        return new LocalServerRef (this, aid) ;
    }
    public Object getStub(Object aid) {
        return new StubInfo(getActivatableRef (aid) ,
            getDescriptor( ) .getClientRuntimeDescriptor(getApplicationName( ) ) ,
            getDescriptor( ) .getStubClassName( ) ) ;
    }
    public RemoteReference getActivatableRef (Object aid) {
        return new ActivatableRemoteRef(getObjectID( ) , getHostID( ) , aid) ;
    }
    public Object getImplementation(Object aid) throws RemoteException {
        return activator.activate(aid) ;
```

```
    }
    public Activator getActivator( ) {
        return activator;
    }
    protected void invoke(RuntimeMethodDescriptor md, InboundRequest request,
        OutboundResponse response)
        throws Exception
    {
        Skeleton skeleton = getDescriptor( ) .getSkeleton( ) ;
        if (md.getImplRespondsToClient( ) ) {
            response = new BasicFutureResponse(request, response) ;
        }
        Object aid = (Object) request.getActivationID( ) ;
        Activatable impl = activator.activate(aid) ;
        try {
            response = skeleton.invoke(md.getIndex( ), request, response, impl) ;
        } catch (RemoteException re) {
            throw re;
        } finally {
            activator.deactivate (impl);
        }
    }
}
```

Activatator.java

Activatable allows a client of the activation framework to provide for the reactivation of remote objects. The initial activation is done on behalf of a remote class, possibly on an instance by instance basis, by some agent outside the activation framework. That agent encapsulates the details regarding the mapping of the activation ID and specific instances of Activatable remote objects. The agent is responsible for providing a helper class to the activation framework. This helper class provides the glue between the (opaque) activation ID and the remote object corresponding to the remote object:

```
public interface Activator {
    /**
     * Called by the activation framework to service a request on an
     * activatable remote reference.
     *
     * Returns the remote objcet that corresponds to the parameter. In
     * general the parameter is an instance of ActivationIdentifier, but
     * the contract allows for other activation identifiers such as
     * java.rmi.activation.ActivationID.
     */
    public Activatable activate(Object id) throws
    NoSuchObjectException;
    /**
     * Called by the activation framework at the end of the
     method call
     * Its upto the implementation of the Activator to ignore the
     call if he
     * wishes to do so.
     */
    public void deactivate (Activatable activatable) ;
}
```

EJBActivator.java

```
public class EJBActivator implements Activator {
    private BaseEJBHome homeClass;
    public EJBActivator(BaseEJBHome homeClass) {
        this.homeClass = homeClass;
    }
    public Activatable activate(Object pk) {
        Activatable eo = (Activatable) homeClass.allocateEO(pk) ;
        return eo;
    }
    public void deactivate(Activatable eo) {
        //( (EntityEJBHome) homeClass) releaseEO (eo) ;
    }
}
```

StatefulEJBObject.java

```
abstract public class StatefulEJBObject
    extends ReplicatedStatefulEJBObject
    implements Activatable, java.rmi.Remote
{
    private Activator ejbActivator;
    // implement weblogic.rmi.extensions.activation.Activatable interface
    public Activator getActivator( ) {
        return ejbActivator;
    }
    public void setActivator(Activator ejbActivator) {
        this.ejbActivator = ejbActivator;
    }
    public Object getActivationID( ) {
        return getPK( ) ;
    }
}
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers may use and benefit from the invention. In addition, while the invention is described in terms of clients accessing servers, it will be evident that the invention also applies to servers accessing other servers. The code example given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer system for remote object activation, comprising:
    a server having at least one processor that receives requests from clients to access objects on said server;
    a plurality of objects located at the server, wherein each object can be accessed remotely by the clients;
    a plurality of object implementations of each object located at said server, wherein each of said plurality of object implementations has a corresponding activation ID, wherein each activation ID is specific to that object implementation, and wherein each client requesting access to a particular object accesses a different object implementation of the particular object;
    a plurality of server references each associated with a different object at the server that each services request from clients to access its associated object regardless of whether an implementation of its associated object is active, and encapsulates addressing information and instance identifiers corresponding to its associated object, wherein only a single copy of each server reference is retained at the server regardless of how many object implementations are created for its associated object;
    wherein a server reference for the particular object is created at the server upon the server receiving an initial request to access the particular object, where the server reference for the particular object does not already exist on the server;
    wherein the activation ID is sent from the server to the requesting client and stored at the client as part of an activatable remote reference to the object implementation;
    wherein the server activates said object implementation located at said server upon receiving from the client a request to access the object that specifies the corresponding activation ID; and
    further wherein object implementations are deleted during garbage collection when no longer in use, so that only a single copy of each server reference associated with each object is stored at the server, and wherein when a call subsequently comes in from the client, the object implementation is reactivated using the corresponding activation ID.

2. The computer system of claim 1 wherein each of said plurality of objects have a server ID and object ID associated therewith.

3. The computer system of claim 2 wherein said activatable remote reference further includes:
    the server ID and the object ID.

4. The computer system of claim 1 wherein an activator is used to activate or deactivate objects.

5. The system of claim 1 further comprising:
    a second object implementation that implements a second object, and that is located at said server, wherein said second object implementation has a corresponding second activation ID associated with it that is different for each client requesting access to the second object; and
    a second server reference at the server that services requests from clients to access the second object regardless of whether an implementation of the second object for the clients is active, and encapsulates addressing information and instance identifiers corresponding to the second object, wherein only a single copy of the second server reference is retained at the server regardless of how many second object implementations are created for the second object;
    wherein the server is a runtime environment for both the server reference and the second server reference.

6. The computer system of claim 1 wherein the server:
    receives requests to access the particular object from a first client and a second client;
    for each request, generates a new activation ID and associates that activation ID with that request;
    determines a particular server reference associated with the particular object; and
    uses the particular server reference to service all requests for any implementation of the particular object from both the first client and the second client.

7. The computer system of claim 1 further comprising:
    a virtual machine, executing on the server, which includes a first object and a second object;
    a first server reference associated with the first object, wherein the first server reference services all requests for any implementation of the first object; and
    a second server reference associated with the second object, wherein the second server reference services all requests for any implementation of the second object.

8. A method for activation of remote objects, comprising the steps of:
    providing a plurality of objects located at a server, wherein each object can be accessed remotely by clients;
    receiving a request from a client at a server to access an object on the server;
    determining an activation ID associated with said request that is different for each client requesting access to the object;
    storing a plurality of server references each associated with a different object at the server that each services request from clients to access its associated object regardless of whether an implementation of its associated object is active, and encapsulates addressing information and instance identifiers corresponding to its associated object, wherein only a single copy of each server reference is retained at the server regardless of how many object implementations are created for its associated object; and activating at the server one of a plurality of object implementations of the object located at the server corresponding to the activation ID associated with the request, wherein each of said plurality of object implementations has a corresponding activation id, wherein each activation ID is specific to that object implementation, and wherein each client requesting access to a particular object accesses a different object implementation of the particular object;

wherein the server reference for the particular object is created at the server upon the server receiving an initial request to access the particular object, where the server reference for the particular object does not already exist on the server;

wherein the activation ID is sent from the server to the client and stored at the client as part of an activatable remote reference to the object implementation; and further wherein object implementations are deleted during garbage collection when no longer in use, so that only a single copy of each server reference associated with each object is stored at the server, and wherein when a call subsequently comes in from the client, the object implementation is reactivated using the corresponding activation ID.

9. The method of claim 8 wherein each of said plurality of objects have a server ID and object ID associated therewith.

10. The method of claim 9 wherein said activatable remote reference further includes:
the server ID and the object ID.

11. The method of claim 8 wherein an activator is used to activate or deactivate objects.

12. The method of claim 8 wherein the server:
receives requests to access the particular object from a first client and a second client;
for each request, generates a new activation ID and associates that activation ID with that request;
determines a particular server reference associated with the particular object; and
uses the particular server reference to service all requests for any implementation of the particular object from both the first client and the second client.

13. The method of claim 8 wherein the server includes:
a virtual machine, which includes a first object and a second object;
a first server reference associated with the first object, wherein the first server reference services all requests for any implementation of the first object; and
a second server reference associated with the second object, wherein the second server reference services all requests for any implementation of the second object.

14. A system for remote object activation, comprising:
a server having at least one processor that receives requests from a plurality of clients to access a plurality of objects on the server;
a plurality of object implementations of each object located at the server, wherein each object implementation corresponds to a different client that accesses a particular object, and wherein each object implementation is associated with an activation ID specific to that object implementation;
a plurality of server references at the server, wherein each object is associated with a different server reference and each server reference is used to service requests from clients to access any of the object implementations of its associated object, and wherein each server reference is created at the server when the server receives an initial request to access its associated object;
wherein the activation ID associated with a particular object implementation is sent from the server to the requesting client and stored at the requesting client as part of an activatable remote reference for that particular object implementation;
wherein when the server receives a request from a client to access an object, the server reference associated with that object is used to
determine an object implementation associated with the activation ID included with the request,
determine if the object implementation associated with the activation ID is active,
if the object implementation associated with the activation ID is active, send the request to the object implementation to be processed, and
if the object implementation associated with the activation ID is not active, activate the object implementation and then sends the request to the object implementation to be processed.

15. The system of claim 14, wherein the object implementation is garbage collected after responding to the request.

16. The system of claim 14, wherein the object implementation can be deactivated and returned to an object pool for subsequent use.

* * * * *

UNITED STATES PATENT AND TRADEMARK OFFICE
CERTIFICATE OF CORRECTION

PATENT NO.        : 7,793,302 B2              Page 1 of 1
APPLICATION NO.   : 10/372464
DATED             : September 7, 2010
INVENTOR(S)       : Prasad Peddada et al.

It is certified that error appears in the above-identified patent and that said Letters Patent is hereby corrected as shown below:

In column 8, line 1, delete "activates" and insert -- activate() --, therefor.

In column 8, line 45, delete "VersionIUD" and insert -- VersionUID --, therefor.

In column 8, line 57, delete "it" and insert -- if --, therefor.

In column 11, line 43, delete "objcet" and insert -- object --, therefor.

Signed and Sealed this
Sixteenth Day of August, 2011

David J. Kappos
*Director of the United States Patent and Trademark Office*